United States Patent
Ouchi

(10) Patent No.: US 6,257,385 B1
(45) Date of Patent: Jul. 10, 2001

(54) ROLLER CLUTCH BUILT-IN TYPE PULLEY APPARATUS FOR ALTERNATOR

(75) Inventor: Hideo Ouchi, Kanagawa-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/497,338

(22) Filed: Feb. 3, 2000

(30) Foreign Application Priority Data

Feb. 12, 1999 (JP) .................................................. 11-034190
May 20, 1999 (JP) .................................................. 11-139886

(51) Int. Cl.⁷ ............................. F16D 41/06; F16H 55/36
(52) U.S. Cl. ......................... 192/45; 192/110 B; 474/170
(58) Field of Search ........................ 192/45, 45.1, 41 R, 192/110 B; 474/170, 112, 117, 135

(56) References Cited

U.S. PATENT DOCUMENTS

| | | |
|---|---|---|
| 545,017 | 8/1895 | Hargraves . |
| 1,375,576 | 4/1921 | Duca . |
| 1,639,974 | 8/1927 | Andrade, Jr. . |
| 2,044,197 | 1/1936 | Barthel .................................. 192/45 |
| 2,065,244 | 12/1936 | Richards ................................ 192/56 |
| 2,215,615 | 9/1940 | Kreis ..................................... 192/45 |
| 2,292,988 | 8/1942 | Bloomfield et al. .................... 192/45 |
| 2,815,838 | 12/1957 | Dodge .................................... 192/45 |
| 2,835,364 | 5/1958 | Picard .................................... 192/45 |
| 3,194,368 | 7/1965 | Benson et al. ......................... 192/45 |
| 3,545,581 | 12/1970 | Kent .................................... 192/45.1 |
| 3,550,737 | 12/1970 | Kent .................................... 192/45.1 |
| 3,563,352 | 2/1971 | Stibbe ................................... 192/3.5 |
| 3,623,581 | 11/1971 | Livezey ................................. 192/45 |
| 3,978,949 | 9/1976 | Timtner ............................... 192/41 A |
| 3,978,950 | 9/1976 | Timtner ............................... 192/41 A |
| 4,725,259 * | 2/1988 | Miyata ................................... 474/70 |
| 4,735,599 | 4/1988 | Leonard ............................... 474/101 |
| 4,986,140 | 1/1991 | Morishita et al. ......................... 74/7 |
| 5,035,309 | 7/1991 | Takada ................................... 192/45 |
| 5,211,274 | 5/1993 | Milano, Jr. et al. .................... 192/45 |
| 5,215,174 | 6/1993 | Heidenreich ......................... 192/45.1 |
| 5,235,878 | 8/1993 | Young .................................. 81/53.2 |
| 5,279,400 | 1/1994 | Riggle et al. ........................... 192/45 |

(List continued on next page.)

FOREIGN PATENT DOCUMENTS

| | | |
|---|---|---|
| 236659 | 10/1960 | (AU) . |
| 195 31 745 | 3/1996 | (DE) . |
| 2 339 778 | 8/1977 | (FR) . |
| 2 726 059 | 4/1996 | (FR) . |
| 316947 | 12/1930 | (GB) . |
| 726575 | 3/1955 | (GB) . |
| 46-22762 | 6/1971 | (JP) . |
| 56-101353 | 8/1981 | (JP) . |
| 63-176830 | 7/1988 | (JP) . |
| 7-139550 | 5/1995 | (JP) . |
| 7-72585 | 8/1995 | (JP) . |
| 7-317807 | 12/1995 | (JP) . |
| 8-61443 | 3/1996 | (JP) . |
| 8-226462 | 9/1996 | (JP) . |
| 11-22753 | 1/1999 | (JP) . |

*Primary Examiner*—Charles A Marmor
*Assistant Examiner*—Saúl Rodríguez
(74) *Attorney, Agent, or Firm*—Crowell & Moring, L.L.P.

(57) ABSTRACT

A roller clutch built-in type pulley for an alternator having a sufficient durability by securing a sufficient load capacity of a roller clutch in a structure intended to reduce the size and the weight of the apparatus by using a poly-V belt as an endless belt. In the pulley apparatus a roller clutch and a pair of support bearings are provided between the inner peripheral surface of a pulley having a plurality of grooves formed on the outer peripheral surface thereof and the outer peripheral surface of a sleeve. Out of these components, when the diameter of each of a plurality of rollers for constituting the roller clutch is denoted by $D_a$ and the diameter of the inner peripheral surface of a roller clutch outer race is denoted by $D_o$, $D_a/D_o > 0.070$ is established.

2 Claims, 6 Drawing Sheets

U.S. PATENT DOCUMENTS

| | | | |
|---|---|---|---|
| 5,427,458 | 6/1995 | Sanchez | 384/516 |
| 5,485,905 | 1/1996 | Rader, III | 192/64 |
| 5,517,957 | 5/1996 | Wagner et al. | 123/192.1 |
| 5,575,366 | 11/1996 | Zenmei et al. | 192/45 |
| 5,595,272 | 1/1997 | Zhou | 192/45 |
| 5,617,937 | 4/1997 | Zettner et al. | 192/45 |
| 5,672,110 | 9/1997 | Kurita et al. | 464/37 |
| 5,675,202 * | 10/1997 | Zenmei et al. | 192/45 X |
| 5,676,225 * | 10/1997 | Miyata | 192/45 X |
| 5,908,094 | 6/1999 | Le-Calve | 192/41 R |
| 5,996,753 * | 12/1999 | Temme et al. | 192/45 |

\* cited by examiner

ROLLER CLUTCH BUILT-IN TYPE PULLEY APPARATUS FOR ALTERNATOR

This application claims the benefits of Japanese Application Nos. 11-034190 and 11-139886, which are hereby incorporated by reference.

BACKGROUND OF THE INVENTION

1. Field of the Invention

The present invention relates to a roller clutch built-in type pulley apparatus for an alternator to be used in an automobile.

A roller clutch built-in type pulley apparatus for an alternator to be provided by the present invention is fixed to an end portion of the rotary shaft of the alternator which serves as a power generator for a car for wrapping an endless belt onto a driving pulley fixed to an end portion of a crank shaft of the engine, so as to be utilized for driving the alternator. Particularly, the present invention is to realize a useful structure when using a so-called poly-V belt in which a plurality of projections each having a V-shaped cross section are extending along the entire circumference are provided on the inner peripheral surface thereof as the above-mentioned endless belt.

2. Related Background Art

The structure of an alternator for generating necessary electric power for a car by use of a driving engine of the car as its driving source is disclosed in, for example, Japanese Patent Laid-Open No.7-139550. FIG. 5 shows an alternator 1 disclosed in this application. In the alternator 1, a rotary shaft 3 is rotatably supported by a pair of rolling bearings 4, 4 inside the housing 2. In a middle part of this rotary shaft 3, there are provided a rotor 5 and a commutator 6. Also, a pulley 7 is fixed to a portion projecting outward from the housing 2 at one end (the right end in FIG. 5) of this rotary shaft 3. In a state in which it is assembled in the engine, an endless belt is passed over this pulley 7, so that the rotary shaft 3 is rotated and driven by means of a crank shaft of the engine.

As this pulley 7, hitherto a pulley which is simply fixed to the rotary shaft 3 is generally used. However, a variety of kinds of a roller clutch built-in type pulley apparatus for an alternator are proposed recently, which allows transmission of the power through the endless belt to the rotary shaft when a running speed of the endless belt is fixed or shows an upward trend, while allows a relative rotation between the pulley and the rotary shaft when the running speed of the endless belt shows downward trend. Some of such pulley apparatuses are used in practice. For example, a several kinds of such roller clutch built-in type pulley apparatus for an alternator having a function as mentioned above are disclosed in Japanese Patent Laid-Open Nos. 56-101353, 7-317807, 8-61443, and 8-226462, and Patent Publication No. 7-72585, French Patent Publication No. FR2726059A1, etc. Also, some of such roller clutch built-in type pulley apparatuses are actually used in practice.

Out of them, FIG. 6 shows the roller clutch built-in type pulley apparatus for an alternator disclosed in Japanese Patent Laid-Open No. 8-226462. This roller clutch built-in type pulley apparatus for an alternator has a sleeve 8 which is fitted on and fixed to the rotary shaft 3 of the alternator 1 (FIG. 5). Around this sleeve 8, a pulley 7a is provided concentrically with this sleeve 8. On the outer peripheral surface of this pulley 7a, there are formed a plurality of grooves 29, 29 each having V-shaped cross section and extending along the entire circumference in parallel to each other in the axial direction (the left and right direction in FIG. 6). An endless belt which is so-called a poly-V belt and which has a plurality of projections each having a V-shaped cross section and extending along the entire circumference on the inner peripheral surface of the belt is passed over such pulley 7a.

Then, a pair of support bearings 9, 9 and a roller clutch 10 are provided between the outer peripheral surface of the sleeve 8 and the inner peripheral surface of the pulley 7a. Out of them, the support bearings 9, 9 cause a relative rotation between the sleeve 8 and the pulley 7a, while supporting a radial load applied on the pulley 7a. On the other hand, the roller clutch 10 causes transmission of the rotating force from this pulley 7a to the sleeve 8 only when the pulley 7a is inclined to rotate relatively to the sleeve 8 in a given direction. In the structure shown In FIG. 6, the support bearings 9, 9 are cylindrical roller bearings. However, angular or deep groove ball bearings are conventionally known as being used as such support bearings, as disclosed, for example, in the above Japanese Patent Laid-Open No. 7-317807.

On the outer peripheral surface of the middle part of the inner race 24 which constitutes the roller clutch 10 and is fitted on and fixed to the sleeve 8, a plurality of recesses 25 called a ramp portion are formed at regular intervals in the circumferential direction, while a cam surface 26 is formed on the outer peripheral surface of the middle part. The outer peripheral surfaces of the both ends of the inner race 24 serve as inner race tracks 27, 27 for the support bearings 9, 9. On the other hand, the inner peripheral surface of the outer race 12 which constitutes the roller clutch 10 and is fitted on and fixed to the pulley 7a is simply formed as a cylindrical surface substantially over the entire length thereof. A plurality of rollers 11, 11 for constituting the roller clutch 10, together with the inner race 24 and the outer race 12, are supported by a retainer 28 to be capable of rolling and displacing a little in the circumferential direction. Then, there is provided a spring between a column portion arranged on this retainer 28 and each of the rollers 11 so that each of the rollers 11 is elastically pressed in the same direction with respect to the circumferential direction.

A roller clutch built-in type pulley apparatus for an alternator as mentioned above is used for the following reason. If, for example, the driving engine is a diesel engine, the angular velocity of rotation fluctuates largely when the engine is idling or rotated at low speed. As a result, the running speed of the unrepresented endless belt which is passed over the driving pulley fixed to the end of the crank shaft fluctuates minutely. On the other hand, the rotary shaft 3 of the alternator 1 which is driven to rotate by this endless belt through the pulley 7a does not fluctuate so drastically due to the inertial masses of this rotary shaft 3 and the rotor 5, the commutator 6 (FIG. 5), and the like fixed to this rotary shaft 3. Accordingly, when the pulley 7a is simply fixed with respect to the rotary shaft 3, the endless belt and the pulley 7a are inclined to rub against each other in the both directions upon fluctuation of the angular velocity of rotation of the crank shaft. As a result, the stress in different directions acts repeatedly on the endless belt which rubs against the pulley 7a, which causes easy slippery between this endless belt and the pulley 7a, or a shortened durability of the endless belt.

The shortened durability of the endless belt based on the friction between the outer peripheral surface of the pulley 7a and the inner peripheral surface of the endless belt as described above is also caused by repeated acceleration or deceleration at running time. That is, the driving force is transmitted from the endless belt side to the pulley 7a side at acceleration, while the braking force acts from the endless belt onto the pulley 7a which intends to continuously rotate based on inertia at deceleration, as described above. The braking force and the driving force respectively act as frictional forces in opposite directions for the inner peripheral surface of the endless belt, which also causes reduction in durability of the endless belt as a result. Particularly, in case of a vehicle equipped with an exhaust brake such as a motor truck, the rotation of the crank shaft when the accelerator is off is conspicuously decelerated, and the frictional force applied on the inner peripheral surface of the endless belt becomes large based on the above-mentioned braking force. As a result, the durability is conspicuously deteriorated.

Then, by the use the above-mentioned roller clutch built-in type pulley apparatus for an alternator as the pulley 7a, it is arranged such that the rotating force is transmitted from the pulley 7a to the rotary shaft 3 when the running speed of the endless belt is fixed or has an upward tendency, while the pulley 7a and the rotary shaft 3 are rotated relative to each other when the running speed of the endless belt has a downward tendency. That is, when the running speed of the endless belt has a downward tendency, the angular velocity of rotation of the pulley 7a is set lower than that of the rotary shaft 3, thereby preventing the endless belt and the pulley 7a from rubbing strongly against each other at a contact portion therebetween. With such arrangement, a direction of the stress which acts upon a part at which the pulley 7a and the endless belt rub against each other is fixed so as to prevent slippery between this endless belt and the pulley 7a or deterioration of the durability of the endless belt.

In order to design a pulley for rotating and driving the alternator 1, since conventionally it was primarily aimed to enhance the efficiency in the power generation by accelerating the rotation speed of the rotor 5, a space for installing the roller clutch 10 is reduced and the outer diameter $D_a$ of each of the rollers 11 for constituting this roller clutch 10 is also reduced. Consequently, in case of the conventionally-known roller clutch built-in type pulley apparatus for an alternator, a ratio $D_a/D_o$ of the outer diameter $D_a$ of each of the rollers 11 to the inner diameter $D_o$ of the inner peripheral surface of the outer race 12, which constitutes the roller clutch 10 and is contacted by the rolling surface (the outer peripheral surface) of the roller 11, is about 0.05 to 0.07.

As described above, when a value for the ratio $D_a/D_o$ of the outer diameter $D_a$ of each of the rollers 11 to the inner diameter $D_o$ of the inner peripheral surface of the outer race 12 is small, a load capacity of the roller clutch 10 becomes insufficient, so that a roller clutch built-in type pulley apparatus for an alternator having a sufficient durability can not be always realized. Particularly, the drawbacks mentioned above become conspicuous in the structure using the pulley 7a which has a plurality of grooves 29, 29 each having a V-shaped cross section and extending along the entire circumference formed on the outer peripheral surface thereof in parallel to each other in the axial direction, to carry the poly-V belt thereover, which is to be provided by the present invention. That is, in the structure using the poly-V belt as the endless belt, the outer diameter of this pulley 7a is often reduced to make the pulley apparatus light and compact, instead that a frictional area between the inner peripheral surface of the endless belt and the outer peripheral surface of the pulley 7a per unit length in the circumferential direction is enlarged. In case of such structure, the inner diameter $D_o$ of the inner peripheral surface of the outer race 12 becomes small so that a special consideration is required to securely maintain a necessary torque capacity.

SUMMARY OF THE INVENTION

The roller clutch built-in type pulley apparatus for an alternator of the present invention has been contrived taking these circumstances into consideration.

According to the present invention, there is provided a roller clutch built-in type pulley apparatus for an alternator which comprises a sleeve to be fitted on and fixed to a rotary shaft of the alternator, a pulley provided around the sleeve concentrically therewith and having a plurality of grooves each having a V-shaped cross section and extending along the entire circumference formed on the outer peripheral surface thereof in parallel to each other in the axial direction, a roller clutch provided between a middle part of the outer peripheral surface of the sleeve in the axial direction and a middle part of the inner peripheral surface of the pulley in the axial direction to be capable of transmitting a rotating force between the pulley and the sleeve only when this pulley is inclined to relatively rotate in a given direction with respect to the sleeve, and a pair of support bearings provided between the outer peripheral surface of the sleeve and the inner peripheral surface of the pulley at positions to sandwich the roller clutch therebetween from the both sides in the axial direction so as to rotate the sleeve and the pulley relative to each other while supporting a radial load applied on this pulley.

Particularly, in the roller clutch built-in type pulley apparatus for an alternator according to the present invention, $D_a/D_o<0.070$ is satisfied where the diameter of each of the plurality of rollers for constituting the roller clutch is $D_a$, and the diameter of the inner peripheral surface of the outer race contacted by a rolling surface of each of these rollers is $D_o$. More preferably, the ratio between these both diameters satisfies $D_a/D_o<0.085$. In addition, the maximum value for the ratio $D_a/D_o$ between the both diameters is restricted by a surface having the maximum diameter of the pulley which is used for the poly-V belt and is about 0.17 ($D_a/D_o \leq 0.17$).

In case of the roller clutch built-in type pulley apparatus for an alternator of the present invention having a structure as described above, though the poly-V belt is used as the endless belt and the outer diameter of the pulley is reduced, a torque capacity of the roller clutch can be sufficiently enlarged. More specifically, since the diameter of each of the plurality of rollers for constituting this roller clutch is made sufficiently large in relation to the inner diameter of the outer race for constituting this roller clutch, the torque capacity of the roller clutch can be sufficiently enlarged in the limited space for installation. For this reason, a sufficient durability can be securely obtained even in a use state in which the tension of the belt wrapped over the pulley is increased and the torque transmitted by the roller clutch is large.

DESCRIPTION OF THE PREFERRED EMBODIMENTS

Figure 1:
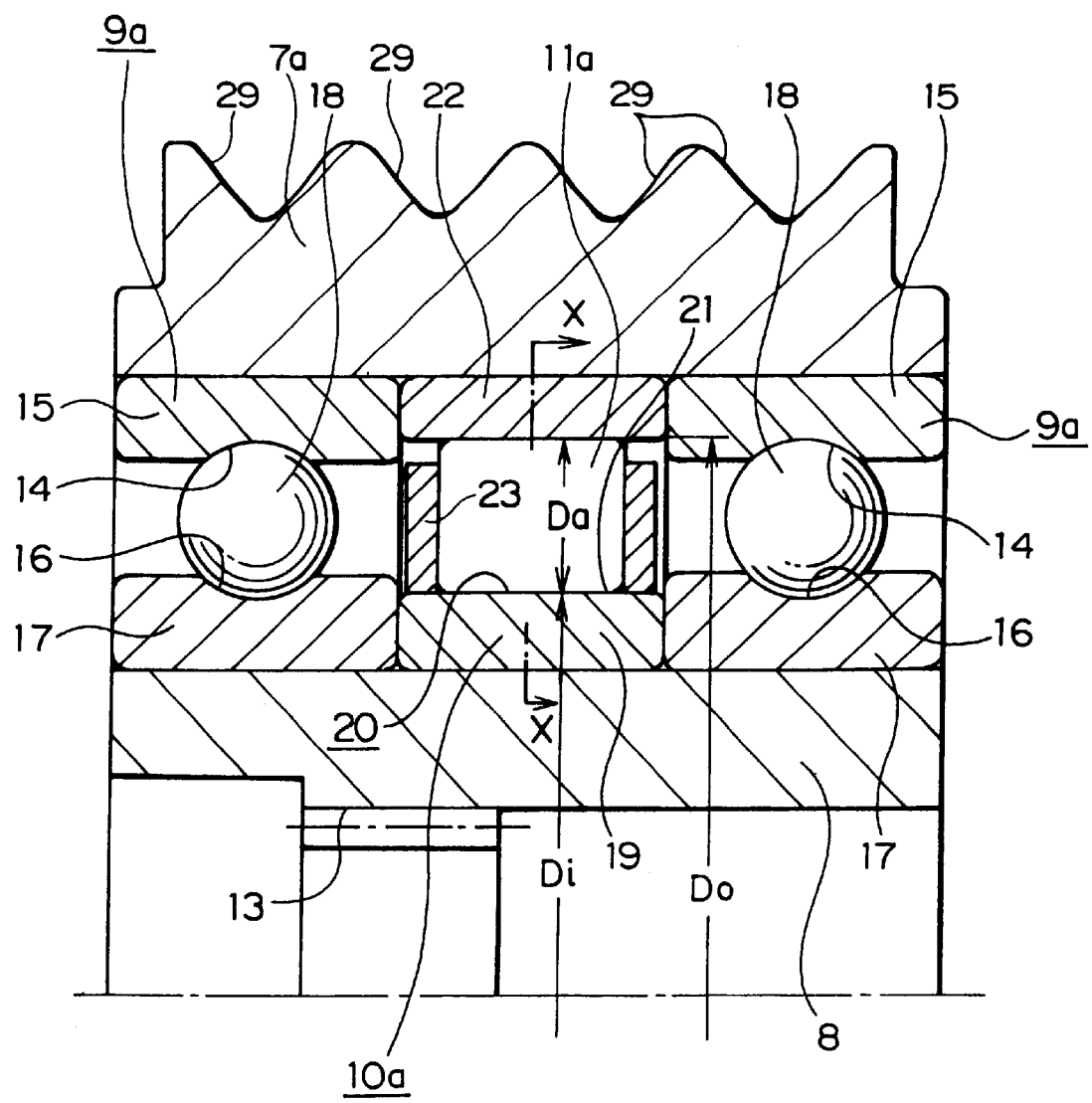
FIG. 1 is a cross sectional view for showing a half part of the pulley apparatus according to a first embodiment of the present invention.
Figure 5:
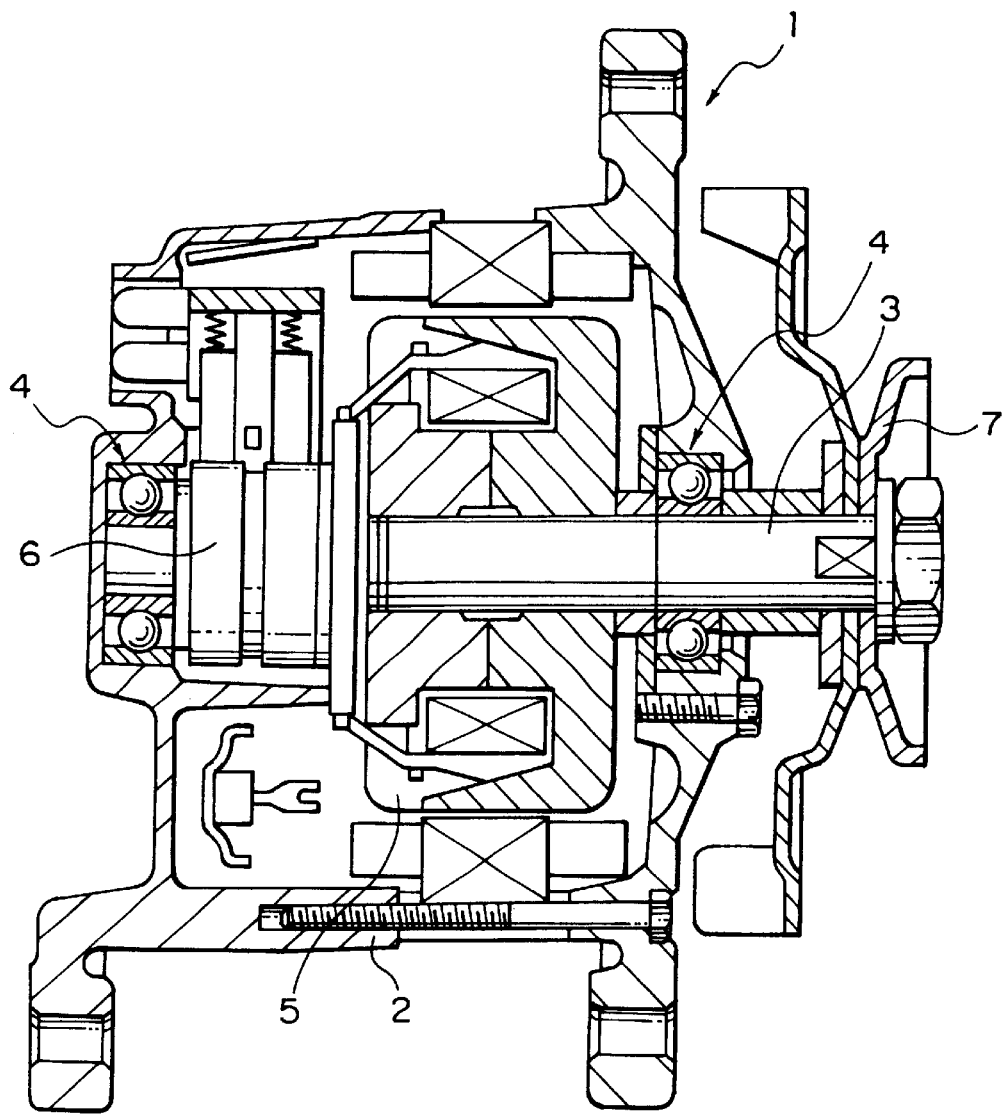
FIG. 5 is a cross sectional view for showing an alternator conventionally known.
Figure 6:
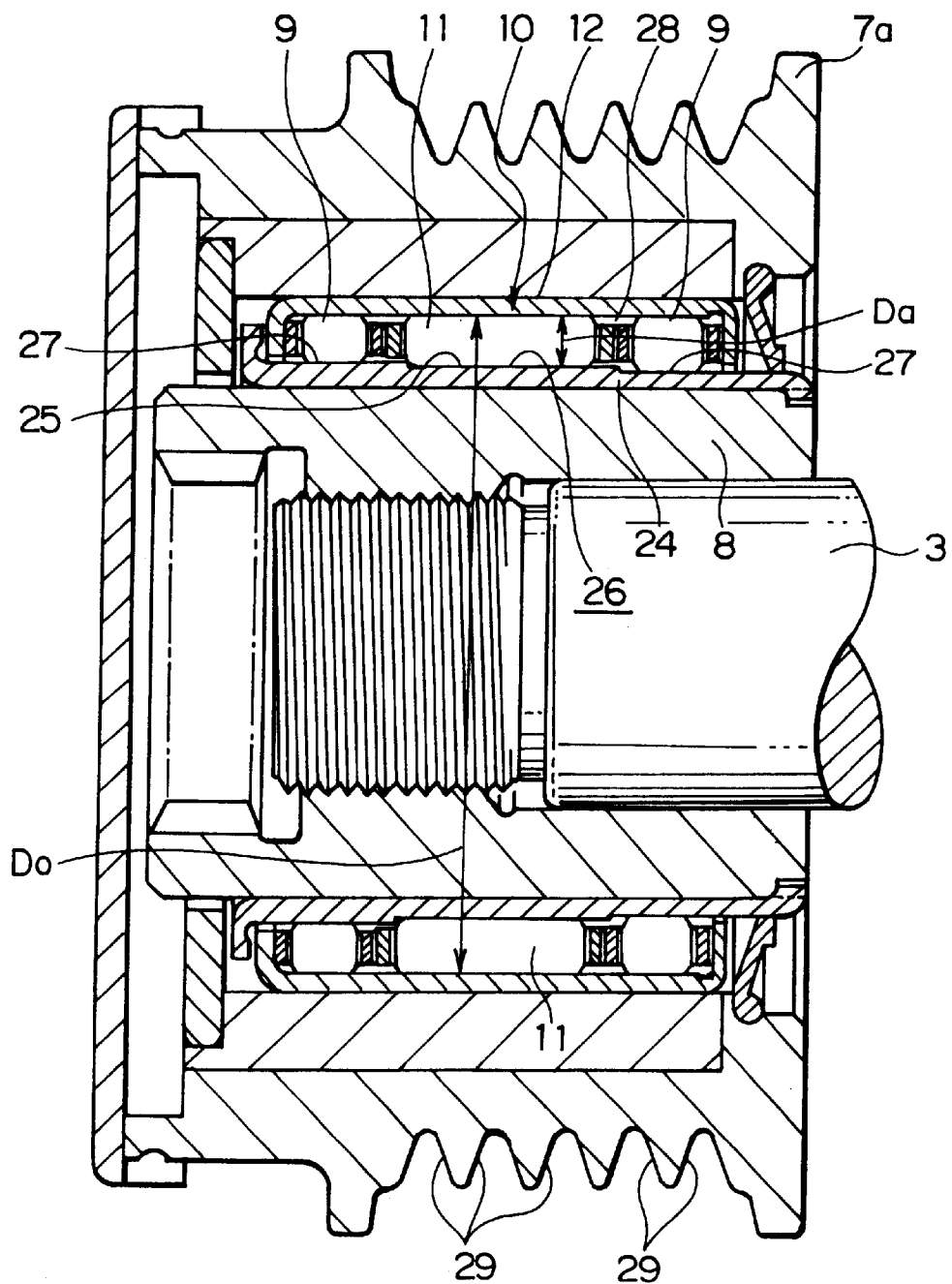
FIG. 6 is a partial cross sectional view for showing a structure of the conventionally-known roller clutch built-in type pulley apparatus for an alternator.

FIG. 1 shows a first embodiment of the present invention, in which a sleeve 8 is formed to be cylindrical as a whole, and is fitted on and fixed to an end portion of the rotary shaft 3 (see FIGS. 5 and 6) of the alternator to be rotatable with this rotary shaft 3. For this reason, in the illustrated structure, a female spline portion 13 is formed on the inner peripheral surface of a middle part of the sleeve 8, and this female spline portion 13 and a male spline portion (omitted in the drawing) which is formed on the outer peripheral surface of an end portion of the rotary shaft 3 are arranged to be engaged with each other. Note that an arrangement for preventing a relative rotation between the rotary shaft 3 and the sleeve 8 may be attained by the screw shown in FIG. 6 mentioned above, or by fitting between non-cylindrical surfaces, or by a key engagement, instead of the spline.

Around the sleeve 8 mentioned above, there is provided a pulley 7a concentrically with this sleeve 8. Support bearings 9a, 9a and a roller clutch 10a, which will be described later, are provided between the inner peripheral surface of the pulley 7a and the outer peripheral surface of the sleeve 8. On the outer peripheral surface of the pulley 7a, a plurality of grooves 29, 29 each having a V-shaped cross section and extending along the entire circumference are formed to have a wave-formed cross section in the width direction, to wrap or pass therearound a part of an endless belt called a poly-V belt.

Between the outer peripheral surface of the sleeve 8 and the inner peripheral surface of the pulley 7a constituted as mentioned above, there are provided a pair of support bearings 9a, 9a and one roller clutch 10a. Out of them, the support bearings 9a, 9a are arranged, while supporting a radial load which is applied on the pulley 7a, to allow relative rotation between the sleeve 8 and the pulley 7a. In the illustrated structure, deep groove ball bearings are used as the support bearings 9a, 9a. More specifically, these support bearings 9a, 9a are respectively constituted by outer races 15, 15 having the outer race tracks 14, 14 of deep groove type on the inner peripheral surfaces thereof, inner races 17, 17 having the inner race tracks 16, 16 of deep groove type on the outer peripheral surface thereof, and a plurality of rolling members (balls) 18, 18 provided between each of the outer race tracks 14, 14 and each of the inner race tracks 16, 16 to be capable of rolling. These support bearings 9a, 9a are respectively provided between the both end portions on the outer peripheral surface of the sleeve 8 and the both end portions on the inner peripheral surface of the pulley 7a by interference-fitting and fixing the outer races 15, 15 thereof in and to the both end portions of the inner peripheral surface of the pulley 7a, and interference-fitting and fixing the inner races 17, 17 thereof on and to the both end portions on the outer peripheral surface of the sleeve 8.

Also, the roller clutch 10a can transmit a rotating force between the pulley 7a and the sleeve 8 only when the pulley 7a is inclined to rotate in a given direction with respect to the sleeve 8. For constituting such roller clutch 10a, an inner race 19 for this roller clutch is interference-fitted on and fixed to the outer peripheral surface of the middle part of the sleeve 8. This roller clutch inner race 19 is formed cylindrical as a whole of hard metal such as bearing steel, and is provided with a cam surface 20 formed on the outer peripheral surface thereof. That is, a plurality of recesses 21 called a ramp portion are formed at regular intervals in the circumferential direction on the outer peripheral surface of the roller clutch inner race 19. The cam surface 20 is formed on this outer peripheral surface. On the other hand, the inner peripheral surface of the roller clutch outer race 22 is formed as a simple cylindrical surface. A plurality of rollers 11a for constituting the roller clutch 10a together with the roller clutch inner race 19 and the roller clutch outer race 22 are supported by a retainer 23 which is made of synthetic resin and is fitted on the roller clutch inner race 19 to be unable to rotate with respect to this roller clutch inner race 19, so as to be capable of rolling and displacement to some extent in the circumferential direction. Then, an elastic member such as a spring is provided between a column portion provided in this retainer 23 and each of the rollers 11a, so that these rollers 11a are elastically pressed in the same direction with respect to the circumferential direction. Note that the structure and the operation of the roller clutch are conventionally known so that detailed illustration and description thereof will be omitted.

Especially, in case of the roller clutch built-in type pulley apparatus for an alternator of the present invention, the diameter $D_a$ of each of the rollers 11a for constituting the roller clutch 10a is set to be large, compared with that of the conventional structure. More specifically, a value exceeding 0.070 is set for the ratio $D_a/D_0$ between the diameter $D_a$ of the roller 11a and the diameter $D_o$ of the inner peripheral surface of the roller clutch outer race 22 ($D_a/D_o$<0.070). For example, in the illustrated structure, the ratio $D_a/D_o$ is set at 0.14.

In case of the roller clutch built-in type pulley apparatus for an alternator of the present embodiment constituted as described above, the torque is transmitted from the pulley 7a to the rotary shaft 3 only when the speed of rotation of this pulley 7a over which the endless belt is wrapped by action of the roller clutch 10a is equal to or higher than that of the sleeve 8 fixed to the rotary shaft 3 of the alternator. Conversely, when the speed of rotation of the pulley 7a is not higher than that of the sleeve 8, the connection between the pulley 7a and the sleeve 8 is intercepted so as to prevent excessive force from being applied on the endless belt.

Especially, in case of the roller clutch built-in type pulley apparatus for an alternator of the present invention, the diameter $D_a$ of each of the plurality of rollers 11a for constituting the roller clutch 10a is set to be sufficiently large in relation with the diameter $D_o$ of the inner peripheral surface of the roller clutch outer race 22 for constituting this roller clutch 10a, so that it is possible to make the torque capacity of this roller clutch 10a sufficiently large. Consequently, sufficient durability can be securely obtained in a use state in which the tension of the endless belt which is wrapped over the pulley 7a is made great and a torque transmitted by the roller clutch 10a becomes large.

The reason that, in the roller clutch built-in type pulley apparatus for an alternator of the present invention, a value exceeding 0.070 is set for the ratio $D_a/D_o$ between the diameter $D_a$ of the roller 11a and the diameter $D_o$ of the inner peripheral surface of the roller clutch outer race 22 is as follows.

When the endless belt is shifted from the deceleration state to the acceleration state, each of the rollers 11a for constituting the roller clutch 10a is pressed by a spring which is provided between it and the column portion of the retainer 23 and bites into a portion which has a narrowed width in the radial direction in a gap between the outer peripheral surface of the roller clutch inner race 19 and the inner peripheral surface of the roller clutch outer race 22, to make a wedge form. In case of a roller clutch built-in type pulley apparatus for an alternator which is generally used for a car and in which the force of the spring for pressing the rollers 11a is small one which is, for example, not more than 1 kgf and the outer diameter of the rotary shaft 3 (FIGS. 5 and 6) is about 15 mm to 20 mm, a circumferential length W which is a total of a spatial length required for retaining each of the rollers 11a to be displaceable in the circumferential direction in order to switch over the roller clutch 10a between a locked state and a overrun state (the length by which the roller 11a is displaceable in the circumferential direction) and another spatial length required for providing the column portion and the spring requires a substantially fixed value (W) which is established by the following Expression (1), irrespective of diameter of the roller 11a. Note that in the Expression (1) $D_i$ denotes the diameter of a portion, out of the outer peripheral surface of the roller clutch inner race 19, in contact with the rolling surface of the roller 11a satisfying $D_i \approx D_o - 2D_a$, and Z denotes the number of the rollers 11a.

$$\pi \cdot (D_i + D_a)/Z = D_a + W \qquad (1)$$

The maximum value $P_{max}$ of a contact surface pressure between the rolling surface of the roller 11a and the outer peripheral surface of the roller clutch inner race 19 and a contact surface pressure of the inner peripheral surface of the roller clutch outer race 22 is established by the following Expression (2). Note that in the Expression (2), E denotes a Young's modulus (kgf /mm$^2$), m a Poisson's number, $\Sigma\rho$ a sum (mm$^{-1}$) of curvatures of a pair of cylindrical surfaces which are in contact with each other, $Q_{max}$ the maxim value (kgf) of a load in the normal direction applied on these both cylindrical surfaces, and La length of contact between these both cylindrical surfaces.

$$P_{max} = [\{E/\pi/(1-1/m^2)\} \cdot (\Sigma\rho/2) \cdot Q_{max}/La]^{1/2} \qquad (2)$$

In order to prevent damages such as cracks from being generated on the outer peripheral surface of the roller clutch inner race 19 on which a large surface pressure is applied, compared with the inner peripheral surface of the roller clutch outer race 22, and for securing the durability of the roller clutch 10a, it is required to limit the maximum value $P_{max}$ for the load which is applied on the roller clutch inner race 19 and the outer peripheral surface of each of the rollers 11a in the normal direction to be not more than a given value within a range from 250 kgf/mm$^2$ to 320 kgf/mm$^2$. Since the length of contact La between the outer peripheral surface of the roller clutch inner race 19 and the outer peripheral surface of the rollers 11a is fixed, if the maximum value $P_{max}$ is fixed, the maximum value $Q_{max}$ for the load which is applied on the contact portion between the both peripheral surfaces in the normal direction will satisfy the following Expression (3):

$$Q_{max} \sim 1/\Sigma\rho \qquad (3).$$

Further, compared with the diameter $D_a$ of the roller 11a, the radius of curvature of the cam surface 20 with which the outer peripheral surface of the roller 11a is brought into contact is far larger, so $1/\Sigma\rho$ can be approximated to $D_a/2$, and that the following Expression (4) is deduced from the Expression (3):

$$Q_{max} \, D_a \qquad (4).$$

Figure 2:
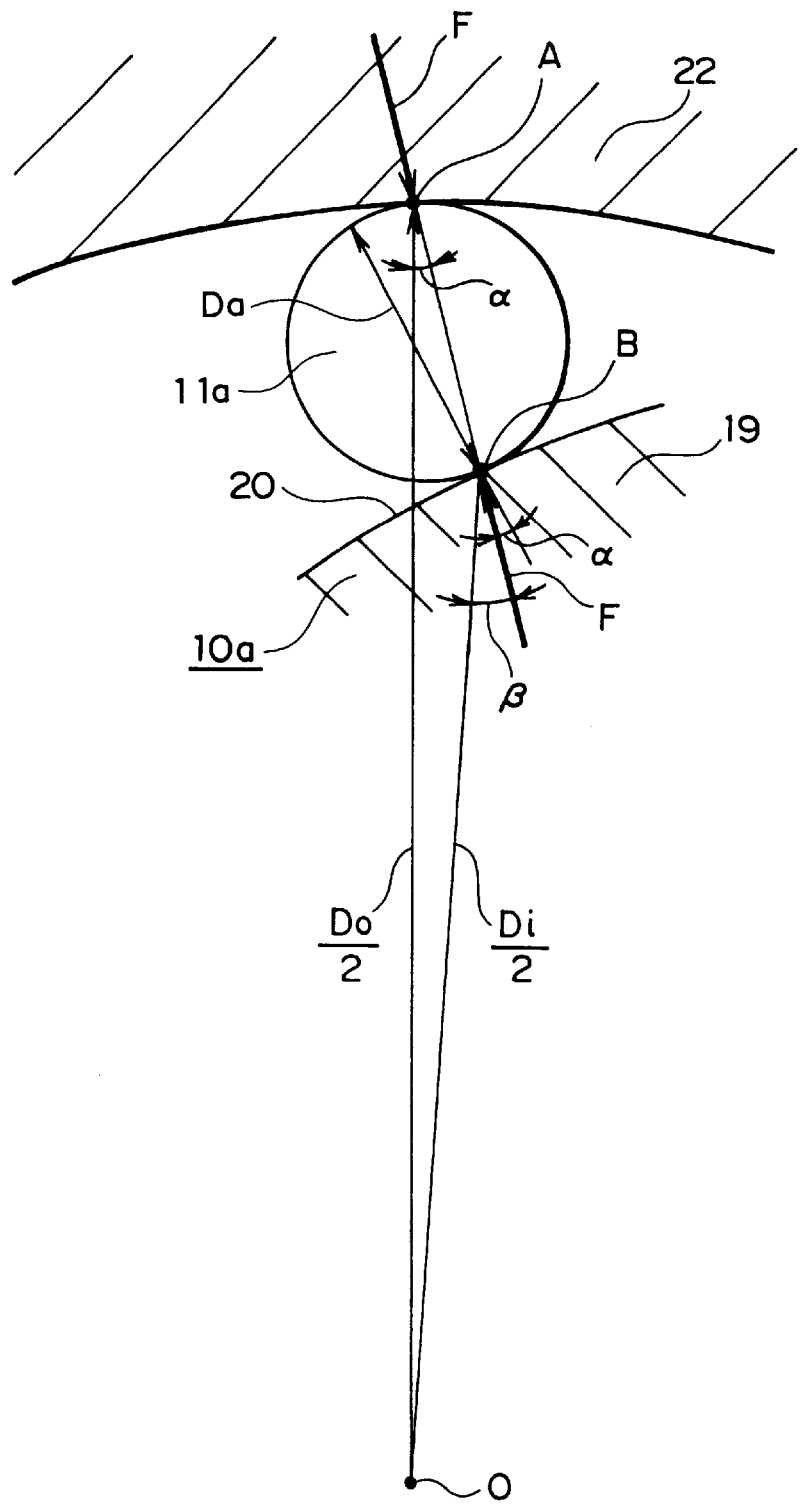
FIG. 2 is a schematic view for showing a part corresponding to the cross section taken along X—X in FIG. 1, for explaining the torque capacity of the roller clutch.

Next, the torque capacity T of the roller clutch 10a will be described with reference to FIG. 2. This torque capacity T is expressed by the following Expression (5). Note that in the Expression (5), F denotes a force with which the cam surface 20 and the inner peripheral surface of the roller clutch outer race 22 press the rolling surface of the roller 11a upon locking, α denotes a contact angle between the rolling surface of the roller 11a and the cam surface 20 and a fixed value which is determined in a range from 4 to 5 degrees in order to realize a locked state of the roller clutch 10a, and β denotes an angle of intersection between a load vector acting on the roller 11a and a straight line for connecting the rolling surface of the roller 11a and the center of rotation of the cam surface 20.

$$T = F \cdot \sin\beta \cdot Z \cdot D_i/2 \qquad (5); \text{ and}$$

$$F \cdot \cos\alpha = Q_{max} \qquad (6).$$

If the Expression (6) is substituted for the Expression (5) to eliminate F, the following Expression (7) can be obtained:

$$T = Z \cdot Q_{max} \cdot D_i \cdot (\sin\beta/\cos\alpha)/2 \qquad (7)$$

When the sine theorem is applied to ΔAOB which is a triangle for connecting three points, the contact point A between the inner peripheral surface of the roller clutch outer race 22 and the rolling surface of the roller 11a, and B between the cam surface 20 and the rolling surface of the roller 11a, and the central point O of the roller clutch outer race 22, the following Expression (8) can be obtained:

$$\sin\beta/(D_o/2) = \sin\alpha/(D_i/2) \qquad (8).$$

If the Expression (8) is substituted for the Expression (7) to eliminate sin β, the following Expression (9) can be obtained:

$$T = Z \cdot Q_{max} \cdot D_i \cdot (1/\cos\alpha) \cdot (D_o/D_i) \cdot (\sin \alpha/2) = Z \cdot Q_{max} \cdot D_o \cdot \tan\alpha/2 \qquad (9).$$

Here, if $Q_{max} \, D_a$, $D_a = (D_i \cdot \pi - Z \cdot W)/(Z \cdot \pi)$ is substituted for the Expression (9) and tan α is constant, the following Expression (10) can be obtained:

$$T \, Z \cdot D_a \cdot D_o \, Z \cdot \{(D_i \cdot \pi - Z \cdot W)/(Z - \pi)\} \cdot D_o \qquad (10).$$

Here, if the second cosine theorem is used for the above-mentioned ΔAOB, the following Expression (11) can be obtained:

$$\cos\alpha = \{(D_o/2)^2 + D_a^2 \cdot \cos^2\alpha - (D_i/2)^2)\}/\{(D_o/2) \cdot D_a \cos\alpha\} \qquad (11).$$

If this Expression (11) is solved for $D_o$, the following Expression (12) will be obtained:

$$D_o = 2D_a \cdot \cos^2\alpha + \sqrt{(D_i^2 + 4D_a^2 \cdot \cos^4\alpha - 4D_a^2 \cdot \cos^2\alpha)} \qquad (12).$$

If this Expression (12) is substituted for the above Expression (10), the following Expression (13) will be obtained:

$$T \, Z \cdot \{(D_i \cdot \pi - Z \cdot W)/(Z - \pi)\} \cdot \{2D_a \cdot \cos^2\alpha + \sqrt{(D_i^2 + 4D_a^2 \cdot \cos^4\alpha - 4D_a^2 \cdot \cos^2\alpha)}\} \qquad (13).$$

In case of the roller clutch built-in type pulley apparatus for an alternator of a car, a sum of the outer diameter of the rotary shaft 3 (FIG. 5) of the alternator 1 and the thicknesses which are necessary for the sleeve 8 and the roller clutch inner race 19 in terms of strength becomes the outer diameter $D_i$ of this roller clutch inner race 19, and a value to be set therefor is around 28 mm to 38 mm. Also, in order to achieve the locked state and the overrun state repeatedly, the circumferential length W which is a sum of the spatial length required for retaining each of the rollers 11a to be displaceable in the circumferential direction and the spatial length required for providing the column portion and the spring is around 2 mm to 3 mm. Note that if this circumferential length W can be reduced, it is possible to assemble a larger number of rollers 11a in the pulley apparatus so that the torque capacity of the roller clutch 10a can be enhanced. However, the contact angle α for attaining the locked state of this roller clutch 10a is a small value of 4 to 5 degrees, as mentioned above. For this reason, even if the diameter of the cam surface 20 which is formed on the outer peripheral surface of the roller clutch inner race 19 varies a little, the circumferential position of each of the rollers 11a in the state in which the roller clutch 10a is locked largely fluctuates. Taking this arrangement into consideration, it is difficult to set a too small value for the circumferential length W. Then, if taking these circumstances into account, this circumferential length W is required to be 2 mm to 3 mm or around.

Figure 3:
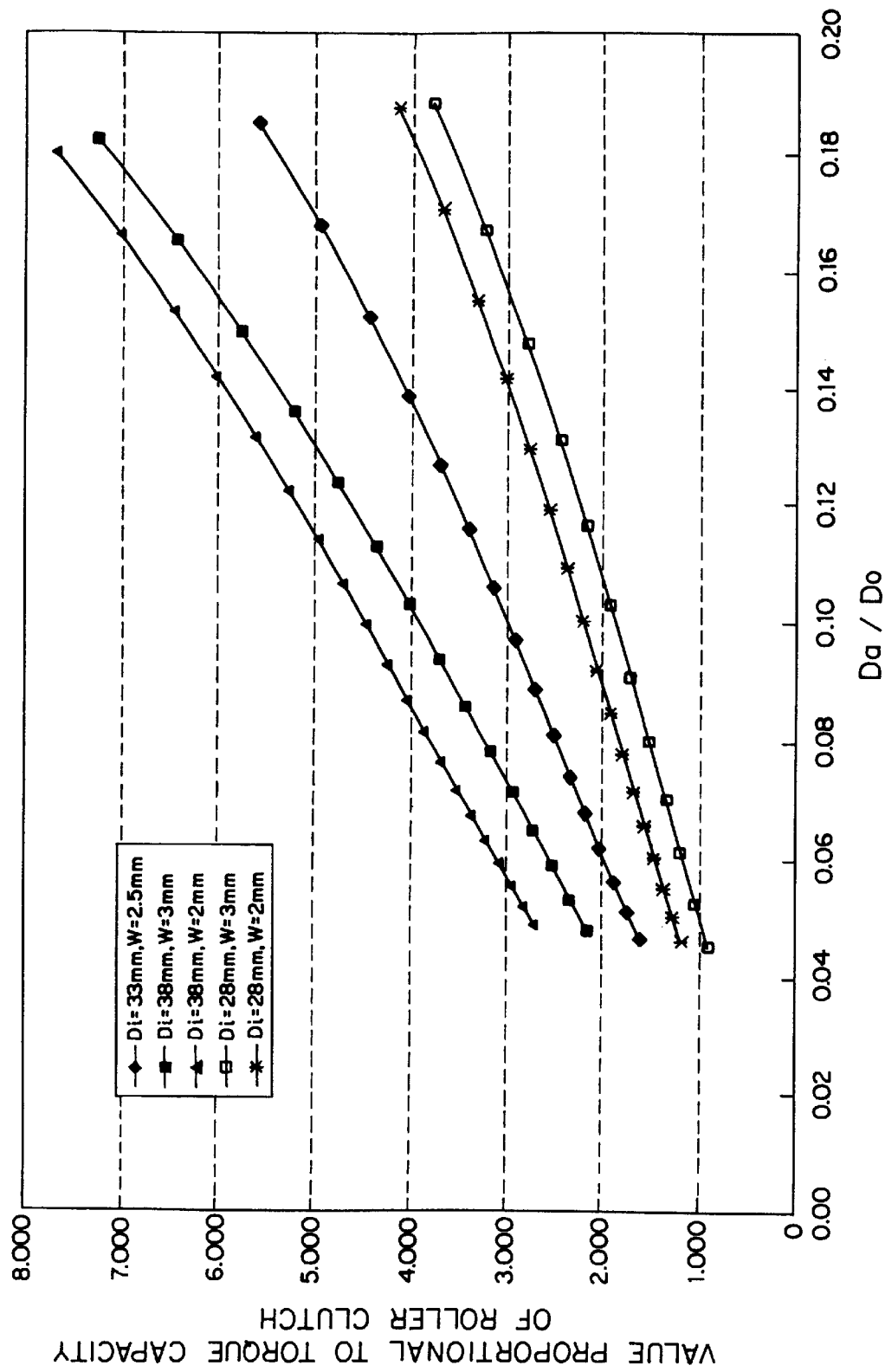
FIG. 3 is a graph for showing an influence of the ratio between the diameter of the roller and the diameter of the inner peripheral surface of the roller clutch outer race on the torque capacity of the roller clutch.

Then, in a variety of combinations of the outer diameter $D_i$ of the roller clutch inner race 19 and the circumferential length W, a value proportional to the torque capacity of the roller clutch 10a is calculated from the above Expression (13), and a relation between the calculated value proportional to the torque capacity and the above-mentioned ratio $D_a/D_o$ is shown in FIG. 3. As clearly seen from FIG. 3, the larger the ratio $D_a/D_o$ between the diameter $D_a$ of the roller and the diameter $D_o$ of the inner peripheral surface of the roller clutch outer race 22 is, the greater the torque capacity of the roller clutch 10a becomes in any combination. Then, it can be seen that a great capacity can be obtained in a pulley apparatus in which this ratio $D_a/D_o$ exceeds 0.07, such as one of the present invention, compared with the conventional pulley apparatus in which the ratio $D_a/D_o$ is about 0.05 to 0.07.

Further, in the illustrated structure, the outer diameter of the roller clutch inner race 19 is made to be smaller than the outer diameter of each of the inner races 17, 17 for constituting the support bearings 9a, 9a. Consequently, the outer peripheral surface of the roller clutch inner race 19 is more concave inwardly in the radial direction than the outer peripheral surface of each of the inner races 17, 17 for constituting the support bearings 9a, 9a. Then, it is arranged such that the inner diameter of the retainer 23 for constituting the roller clutch 10a (the diameter of an inscribed circle of a plurality of convex portions formed on the inner periphery of this retainer 23 to be engaged with the concave portions 21) is larger than the outer diameter of the roller clutch inner race 19 and is smaller than the outer diameter of each of the inner races 17, 17 for constituting the support bearings 9a, 9a. Consequently, the end portions near to the inner diameters of the side surfaces of the retainer 23 in the axial direction are respectively opposite to the end surfaces of the inner races 17, 17 in the axial direction, and the retainer 23 is prevented from displacing in the axial direction (the right and left direction in FIG. 1) by means of the inner races 17, 17. For this reason, the rollers 11a retained by the retainer 23 do not deviate from the outer peripheral surface of the roller clutch inner race 19 and the inner peripheral surface of the roller clutch outer race 22. As a result, it is no longer required to subject the roller clutch inner race 19 and the roller clutch outer race 22 respectively formed of hard metal such as bearing steel for constituting this roller clutch 10a to troublesome treatments to prevent the retainer from displacing in the axial direction, thereby reducing the cost of the roller clutch built-in type pulley apparatus for an alternator.

At the same time, in the illustrated structure, the outer diameter of the retainer 23 is arranged to be smaller than the inner diameter of each of the outer races 15, 15 for constituting the support bearings 9a, 9a. Consequently, even when the end portion near the inner diameter of one side surface of the retainer 23 in the axial direction abuts upon an end surface of the inner race 17 for constituting either of the support bearings 9a, the end portion near the outer diameter of the side surface of the retainer in the axial direction is not brought into contact with an end surface of the outer race 15 for constituting the support bearing 9a. For this reason, the retainer 23 does not rub against the outer race 15 and the inner race 17 which are rotated relatively to each other as if bridging them to enhance a rotational resistance of this support bearing 9a.

Note that, as a variation of the present embodiment, the outer diameter and the inner diameter of the retainer 23 can be arranged to be larger than those shown in the drawing, so that it is possible to prevent displacement of the retainer 23 in the axial direction by bringing the end portions near the outer diameter of the both side surfaces of the retainer 23 in the axial direction into engagement with the end surfaces in the axial direction of the outer races 15, 15 for constituting the support bearings 9a, 9a. Further, the retainer 23 is not necessarily required to be engaged with the end surfaces in the axial direction of the outer races 15, 15 or the inner races 17, 17 for constituting the support bearings 9a, 9a over the entire circumference. A part thereof in the circumferential direction may be protruded in the radial direction and this protruded part may be brought into engagement with the end surfaces in the axial direction of the outer races 15, 15 or the inner races 17, 17.

In the illustrated embodiments, ball bearings are adopted for the support bearings. The ball bearings can support not only radial load but also thrust load generated during power transmission through the belt. Therefore, the structure using the ball bearings is advantageous over the conventional structure adopting the needle or roller bearings. More in detail, in the prior art structure shown in FIG. 6, a thrust load is supported by a sliding bearing formed by a radially outward flange of the inner race 24 and an annular plate fixed to the pulley 7a which makes relative rotation to the sleeve 8 at the time of overrunning of the roller clutch. The sliding bearing having such a structure generates relatively more heat, so grease for lubricating the roller clutch is apt to be deteriorated earlier.

In the illustrated embodiments the diameter of each roller of the roller clutch is made relatively large to have enough space between the pulley 7a and the sleeve 8 to install the ball bearings therebetween. Because of the combination of the roller clutch and the ball bearings in the embodiments as illustrated, sufficient torque capacity of the roller clutch 10a can be obtained, and moreover since thrust load is supported by the ball bearings, heat generations is decreased and accordingly life of grease for the roller clutch may be made longer.

Figure 4:
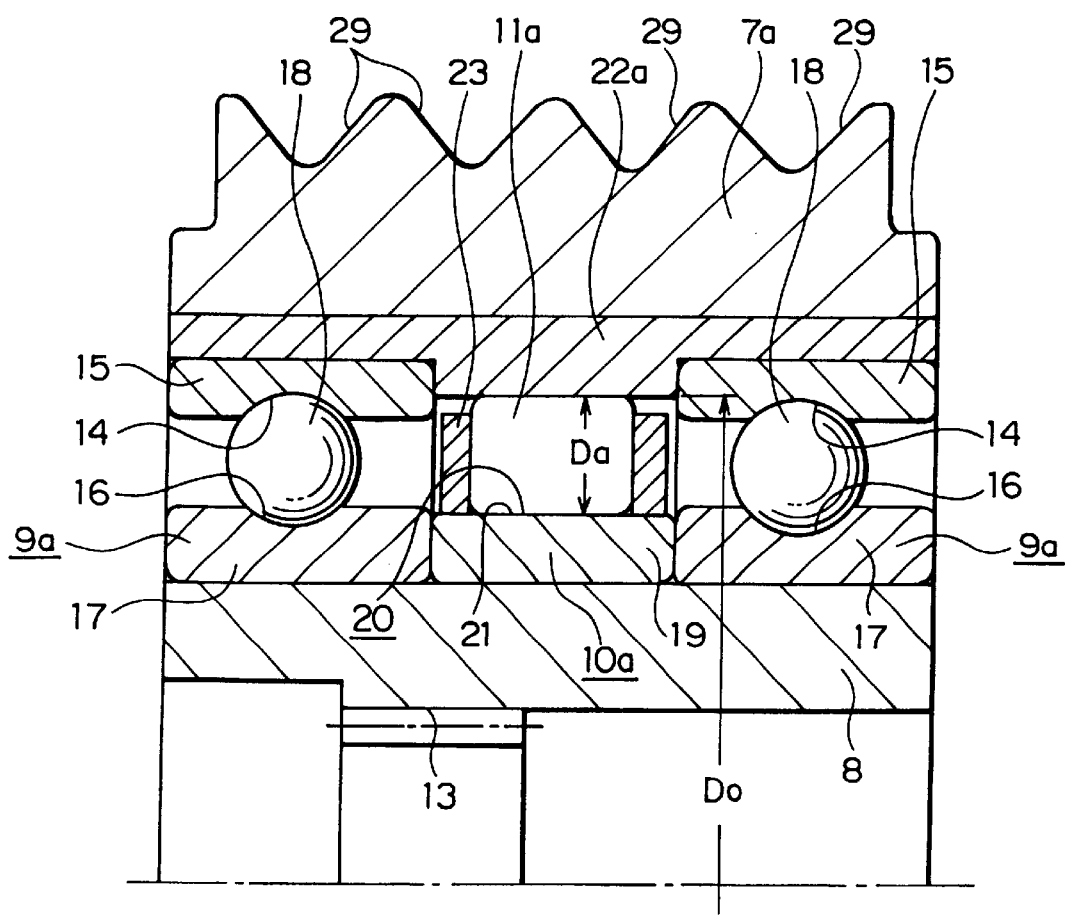
FIG. 4 is a cross sectional view for showing a half part of the pulley apparatus according to a second embodiment of the present invention.

Next, FIG. 4 shows a second embodiment of the present invention, in which an outer race 22a for a roller clutch is formed to be wide and the outer races 15, 15 for respectively constituting the support bearings 9a, 9a are fitted in and fixed to the both end portions of this roller clutch outer race 22a. In such structure, before being assembled between the inner peripheral surface of the pulley 7a and the outer peripheral surface of the sleeve 8, the pair of support bearings 9a, 9a and the roller clutch 10a can be treated as non-separated units, so that it is possible to improve the assembling workability of the roller clutch built-in type pulley apparatus for an alternator. Also in this variation, it is intended to secure the torque capacity of the roller clutch 10*a* by setting the ratio $D_a/D_o$ between the diameter $D_a$ of the roller 11*a* and the diameter Do of the inner peripheral surface of the middle part of the roller clutch outer race 22*a* at a value of 0.12 which exceeds 0.07 substantially. Other arrangements and operations in this variation are the same as those in the first embodiment stated before.

The roller clutch built-in type pulley apparatus for an alternator of the present invention is arranged and operated as described above, so that it is possible to securely obtain a sufficient durability of the apparatus in such use condition in which a large load is imposed, in a structure intended to reduce the size and the weight of the apparatus by using a poly-V belt as the endless belt, by increasing the tension of this endless belt.

What is claimed is:

1. A roller clutch built-in type pulley apparatus for an alternator, comprising:

a sleeve to be fitted on and fixed to a rotary shaft of the alternator;

a pulley provided around said sleeve concentrically therewith and having a plurality of grooves each having a V-shaped cross section and extending along the entire circumference formed in parallel to each other on the outer peripheral surface thereof in the axial direction;

a roller clutch provided between a middle part of the outer peripheral surface of the sleeve in the axial direction and a middle part of the inner peripheral surface of the pulley in the axial direction to be capable of transmitting a rotating force between the pulley and the sleeve only when this pulley is inclined to relatively rotate in a given direction with respect to said sleeve; and a pair of support bearings provided between the outer peripheral surface of said sleeve and the inner peripheral surface of the pulley at positions to sandwich the roller clutch therebetween from the both sides in the axial direction so as to rotate the sleeve and the pulley relative to each other while supporting a radial load applied on this pulley, characterized in that $D_a/D_o>0.070$ is satisfied when the diameter of each of the plurality of rollers for constituting said roller clutch is Da, and the diameter of the inner peripheral surface of the outer race contacted by a rolling surface of each of these rollers is $D_o$.

2. A roller clutch built-in type pulley apparatus for an alternator according to claim 1, wherein said pair of support bearings are ball bearings.

* * * * *